Patented Jan. 21, 1930

1,744,582

UNITED STATES PATENT OFFICE

EARLE B. SCOTT, OF VERONA, NEW JERSEY, ASSIGNOR, BY MESNE ASSIGNMENTS, TO THE TOLEDO AUTOMATIC BRUSH MACHINE COMPANY, OF TOLEDO, OHIO, A CORPORATION OF OHIO

CELLULOID MOLDING POWDER AND PROCESS FOR PRODUCING THE SAME

No Drawing.   Application filed February 17, 1923.   Serial No. 619,761.

This invention relates to improvements in celluloid molding powder and processes for producing the same.

In the manufacture of celluloid articles from celluloid stock the usual form of the material or stock furnished to the trade which manufactures celluloid articles is in sheets, rods or tubes of varying thicknesses, the size usually being standard, and owing to the form in which such stock is made up a relatively large quantity of scrap is produced, so that in manufacturing the average line of celluloid articles the amount of scrap produced seldom goes below 25% of the material used and sometimes reaches as high as 40% thereof. This waste is generally produced because the blanks for molding are of an irregular shape and when cut out cannot be dove-tailed in blanking an entire sheet without leaving a large percentage of unusable skeleton or scrap. If, instead of molding, the blank pieces are cut to shape, the scrap is still further increased. I shall hereinafter refer to this character of scrap as regular scrap.

The scrap celluloid produced in this way, as well as from spoilage, is usually sold back to the manufacturer at a very low price and is then re-worked by costly methods into new celluloid stock of the same form. The usual process of so re-working celluloid is to cut the scrap up in a fodder cutter into small pieces, wash it and then soak it up into a dough-like mass with a solvent composed of camphor and ethyl alcohol. Parts of this dough-like mass, if of proper color, may be added to an entirely new batch of celluloid or a lot composed entirely of scrap may be run through. Usually in the latter case a dark color is produced in order to hide dirt and the variations in color of the original scrap.

Among the objects of this invention are to produce a usable or commercial celluloid molding powder which, upon the application of heat and pressure may be molded into celluloid articles without waste; also to utilize the various kinds of celluloid scrap, in the production of such a usable celluloid at a very low cost and at the same time to overcome the objections to the celluloid produced from the "regular" scrap. To this end I have produced a molding powder composed of a mixture in proper proportions of powdered celluloid, preferably made from scrap, and powdered solid solvent, and I have also devised novel methods or processes which enable such molding powder to be produced and made into celluloid articles within practical economic limits.

I shall now describe my invention as applied to the use of celluloid scrap, though my invention is not limited to the use of scrap but may be carried out advantageously with newly produced celluloid. The said scrap is first preferably cleaned by washing the same in a water and soap solution; it is then preferably subjected to a crushing pressure by which the cellular structure is fractured or broken down and the celluloid scrap assumes a flaky or loosely-cohering form, which flaky substance readily disintegrates into a powder. This crushing is preferably accomplished by passing the said scrap through a pair of rolls and preferably accurately ground steel rolls. By this means the scrap is therefore first crushed to a relatively coarse dust or powder. Celluloid so crushed is in excellent shape to be further reduced to a relatively fine powder and this is preferably accomplished by grinding the initially crushed flaky or coarsely powdered material in a pebble mill. Celluloid cut into small pieces and treated in a pebble mill as has heretofore been done is reduced by attrition and not by crushing and attrition as is the case with more brittle materials not possessing the toughness and elasticity of celluloid. Therefore, by initially crushing the celluloid to small particles by the use of steel rolls and then subjecting it to treatment in the pebble mill for reduction to a fine powder, the time necessary to achieve the object is shortened to such an extent as to be entirely within practical economic limits; whereas if small pieces of celluloid were so placed in the mill and then ground thereby to a powder, the cost would be increased so much that the method would have but little advantage over the present method of utilizing scrap.

In practicing my invention, I have ground numerous batches of such crushed celluloid dry in a pebble mill with an explosive vent, i. e., a canvas-covered opening that would readily give way under a slight pressure and have had no trouble in the way of the celluloid dust firing. I have usually grounded the pebble mill to prevent sparks from frictional electricity and I have used porcelain in preference to flint pebbles in dry grinding. I have also used small mills in which the friction is not as intense as in mills of large diameter. The use of such small mills is made practical through the preliminary or initial crushing of the celluloid by the rolls, the celluloid being placed in the mill in such a comparatively fine state of division that it does not require the heavy attrition of a large diameter mill to reduce it to a fine powder within a practical length of time, viz, thirty-six hours. The celluloid powder should, in order to obtain the best results in a molding powder, be ground in the pebble mill fine enough to pass through a 200 mesh sieve. I have accomplished this reduction to a fine powder of 200 mesh in eighteen hours.

In grinding the crushed celluloid to powder in a pebble mill, I preferably, however, use sufficient water to prevent any fire hazard. This moisture is subsequently removed and preferably is extracted by vacuum-drying or by filter-pressing and vacuum-drying after the celluloid is powdered to a sufficiently fine degree. Celluloid does not absorb moisture as does pyroxylin, and it is therefore comparatively easy to remove such moisture.

In the next step of my process I mix the celluloid powder with a powdered solid solvent of celluloid, such as acetanilid, camphor, methyl acetanilid, or other well known solid solvents or their mixtures. The amount of solid solvent used is controlled largely by the solid solvent initially used in the celluloid scrap and the melting point it is desired to obtain in the solid solvent. The solid solvent employed is usually from 10% to 25% of the weight of the celluloid powder used, and in view of the fact that there is already sufficient camphor in the celluloid powder and that methyl acetanilid has a comparatively low melting point, I prefer to use this solid solvent.

The mixing of the powdered solid solvent and celluloid powder is preferably accomplished by grinding them together in a pebble mill but they may be mixed in any ordinary mixer that will insure a homogeneous product. When the solid solvent is so mixed with the celluloid the mixture is pressed into cakes of the exact form of the mold and when so caked it forms a caked molding powder that can be used directly in molds to make celluloid articles that have all the desirable qualities and characteristics of celluloid articles molded from regular celluloid sheet or tube stock, and furthermore have the additional quality or characteristic that it will with greater perfection and precision take the exact form of the mold and enable sharper outlines to be produced, so that, if desired, delicate half tone printing surfaces may be molded therein. Also, by the use of my molding powder, I am enabled to eliminate the following difficulties usually met in molding sheet, tube or rod stock into articles, viz—

Cracks due to lack of moldability or stretching material beyond its elastic limit, Heat marks due usually to green stock that softens too much, Indefinite molding temperature due to variation in sheet stock brought about by age, temperature and moisture conditions, Warpage due to forcing a mass material into a mold and setting up unequal internal strains.

The mold containing the molding powder is placed under heat and pressure conditions sufficient to cause the solid solvent in the molding powder to melt and dissolve the celluloid, the whole combining under the heat and pressure into a homogeneous solid mass. I have found that when methyl acetanilid is used as the solvent, if the material is subjected to a heat of 100 to 115° C. for a sufficient length of time to liquefy the solvent, and if while thus heated a pressure is applied of about 100 to 500 pounds to the square inch, depending on the form of the mold, the powdered materials will be converted into a homogeneous molded mass, and will retain the exact shape of the mold on cooling under pressure into solid celluloid.

If it is desired to color the celluloid a pigment may be added to the power at the same time the powdered solid solvent is added, a sufficient quantity of the pigment being added, of course, to produce the color effect desired. This is usually the same percentage as in celluloid produced in the regular way.

Dyeing of the celluloid powder can also be effected by placing such celluloid powder, before mixing with the solid solvent, in a dye solution of the proper color containing water and a so-called celluloid-softening agent, such as acteone or acetic acid, which act as softeners in the presence of water. After such dyeing the celluliod is removed from the solution by filter pressing and is dried and mixed with the powered solvent to form a molding powder.

The production of celluloid molding powder in accordance with my invention has advantages over the ordinary process of converting celluloid scrap into usable celluloid. Thus, I eliminate the great waste-producing agents, i. e., the production of sheet-form celluloid and the sheeting, blanking and cake pressing incidental thereto, as my process avoids a great many of the operations of the ordinary process, such as final mixing, rolling, cake-pressing, sheeting, seasoning, straightening, cleaning, blanking and tumbling. It is well known that blanking alone on the average is responsible for wasting twenty-five per cent of all the celluloid made. Another advantage of the production of a celluloid molding powder is that I am enabled to utilize scrap celluloid which may be obtained at a relatively low cost.

Celluloid made by the ordinary process in which a volatile solvent is used has to be seasoned from one week to one year, depending on the thickness. The result of this is a great deal of guessing in the trade as to their requirements months ahead. Many times they are wrong in their guesses and when the period of seasoning has elapsed they either find they have a lot of celluloid on hand that they do not require or else they do not have sufficient quantity of material to fill their orders. The elimination of seasoning, therefore, does away with one of the greatest difficulties or bug-bears of the celluloid industry and one of the things that is often the source of large pecuniary losses. My process makes this guessing unnecessary. By the use of my celluloid molding powder it is possible to start delivery on an order within a day's time.

I am aware that celluloid mixtures of varying compositions have been patented in which the constituents of celluloid have been ground together in a moist condition. All of these, however, take advantage of the use of a volatile solvent in order to lower the temperature at which conversion of the mixture into celluloid can be effected. This is necessarily so for the reason that pyroxylin (out of solution in one of its solid solvents) or in the virgin state decomposes at a lower temperature than the melting point of camphor (175°), it being understood that camphor is the most common solvent of pyroxylin used in the production of the tough commercial celluloid of commerce. Pyroxylin in such virgin state also decomposes at a lower temperature than when in solution in a solid solvent as in the case of celluloid.

The volatile solvent in the case of pyroxylin also effects a more homogeneous mass after conversion. This is not necessary in utilizing celluloid powder as the pyroxylin is already in solution with camphor through this very means. The above is mentioned to bring out the distinction between taking the constituents of celluloid and grinding them together to form a molding powder and taking celluloid itself and grinding it up together with a solid solvent of celluloid to form a molding powder.

I am aware also that patents have been issued for process for the recovery of one or more constituents of celluloid from celluloid scrap. In such cases, however, the celluloid scrap is cut into small pieces and ground to a powder or paste in a pebble mill or sawdust is made out of the celluloid. The use of a pebble mill to grind small pieces of celluloid is, as above stated, of doubtful practicability because of the time required to powder the same by attrition, but in no case has a celluloid powder been mixed with a powdered solid solvent to produce a molding powder from which celluloid articles may be directly made nor has the celluloid been initially crushed or otherwise treated to cause the same to become flaky or partially powdered, nor has such a crushing been used in combination with grinding of the initially crushed material in a pebble mill to expedite the process of powdering celluloid to a fine state.

In the above description I have disclosed a new process for manufacturing celluloid articles by first producing a molding powder consisting of a homogeneous mechanical mixture of powdered celluloid and a powdered solid solvent of celluloid. It is to be understood that the term celluloid has been widely adopted to designate a class of materials which do not necessarily have a precise chemical composition but which nevertheless have certain common characteristics and properties rendering them suitable for a wide variety of commercial uses. In the specification and also in the claims appended hereto I have used the term celluloid to designate generally such materials since, as far as I am aware, there is no other generally accepted name suitable for this purpose.

Having described my invention, I claim:—

1. A molding powder for producing celluloid articles composed of powdered celluloid and a powdered solid solvent of celluloid.

2. A molding powder for producing celluloid articles consisting of a given quantity of celluloid in a finely powdered state and a quantity, also in a finely powdered state and approximating between 10% and 25% of the weight of the celluloid powder, of a solid solvent of celluloid, the said powdered solvent and powdered celluloid being thoroughly mixed together to form a homogeneous product.

3. The process of producing a celluloid molding powder which consists in reducing solid celluloid to a fine powder and mixing such powder with a solid solvent in powdered form to form a homogeneous mass.

4. The process of producing a celluloid molding powder which consists in reducing solid celluloid to a fine powder and then mixing such powder with a powdered solid solvent of from 10% to 25% in weight of the celluloid powder.

5. The process of producing a celluloid molding powder which consists in initially subjecting the solid celluloid to a crushing pressure to cause the same to become flaky, further reducing the same to a fine powder and mixing with such fine powder a powdered solid solvent.

6. The process of producing commercial celluloid articles which consists in forming a comminuted mixture of celluloid and a solid solvent of celluloid substantially free from volatile constituents, placing in a mold a predetermined quantity of said mixture just sufficient to fill the same without excess or overflow and subjecting the mixture in said mold to heat and pressure.

7. The process of producing commercial celluloid articles which consists in forming a comminuted mixture of celluloid and a solid solvent of celluloid substantially free from volatile constituents and subjecting said mixture in a mold to heat and pressure.

8. A molding powder for producing celluloid articles composed of powdered celluloid and a powdered solid solvent of celluloid free from volatile constituents.

9. A molding powder for producing celluloid articles consisting of a given quantity of celluloid in a finely powdered state free from volatile constituents and a quantity also in a finely powdered state and approximating between 10% and 25% of the weight of the celluloid powder, of a solid solvent of celluloid also substantially free from volatile constituents, the said powdered solvent and powdered celluloid being thoroughly mixed together to form a homogeneous product.

10. A molding powder comprising a mechanical mixture of a plurality of powdered substances, one of said substances being a compound of pyroxyline and a plasticizing agent and another substance being a solid solvent of said compound.

11. A molding powder comprising a mechanical mixture of a plurality of powdered substances, one of said substances being a compound containing pyroxyline and camphor and another substance being a solid solvent of said compound.

12. The process of producing commercial molded articles which consists in forming a mechanical mixture of a plurality of comminuted substances, one being a compound containing pyroxyline and a plasticizing agent, and another of said substances being a solid solvent of said compound, both of said substances being substantially free from volatile constitutents, and in subjecting the comminuted mixture in a mold to heat and pressure.

13. An article of manufacture substantially free from internal stress and strain having substantially the properties resulting from the molding under heat and pressure of a homogeneous mechanical mixture of comminuted celluloid and a comminuted solid solvent of celluloid substantially free from volatile substances.

14. An article of manufacture substantially free from internal stress and strain having substantially the properties resulting from the molding under heat and pressure of a homogeneous mechanical mixture of a plurality of substances, one of said substances being plasticized cellulose nitrate and another of said substances being a solid solvent of cellulose nitrate.

15. An article of manufacture substantially free from internal stress and strain having substantially the properties resulting from the molding under heat and pressure of a homogeneous mechanical mixture of a plurality of comminuted substances, one of said substances being a solid solution of pyroxyline and camphor, another of said substances being a solid solvent of pyroxyline.

In witness whereof, I have signed my name to the foregoing specification.

EARLE B. SCOTT.